US011055037B2

(12) United States Patent
Ernst et al.

(10) Patent No.: US 11,055,037 B2
(45) Date of Patent: Jul. 6, 2021

(54) ENHANCED PRINTER AND PRINTER OPERATOR INTERACTIONS

(71) Applicants: Larry M Ernst, Longmont, CO (US); Mike Munson, Boulder, CO (US)

(72) Inventors: Larry M Ernst, Longmont, CO (US); Mike Munson, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 16/584,492

(22) Filed: Sep. 26, 2019

(65) Prior Publication Data
US 2021/0096781 A1 Apr. 1, 2021

(51) Int. Cl.
*G06F 3/12* (2006.01)
*G06K 9/00* (2006.01)

(52) U.S. Cl.
CPC ............ *G06F 3/121* (2013.01); *G06F 3/1234* (2013.01); *G06F 3/1282* (2013.01); *G06K 9/00335* (2013.01); *G06K 9/00671* (2013.01)

(58) Field of Classification Search
CPC ...... G06F 3/121; G06F 3/1234; G06F 3/1282; G06K 9/00335; G06K 9/00671
See application file for complete search history.

(56) References Cited

U.S. PATENT DOCUMENTS

| 7,127,184 B2 | 10/2006 | Coriale et al. |
| 7,668,912 B2 | 2/2010 | Nelson et al. |
| 7,697,850 B2 | 4/2010 | Mathewson |
| 8,121,497 B2 | 2/2012 | Yamada |
| 9,460,314 B2 | 10/2016 | Ballard et al. |
| 9,524,132 B2 | 12/2016 | Weaver et al. |
| 9,805,343 B2 | 10/2017 | Celinder et al. |

(Continued)

FOREIGN PATENT DOCUMENTS

| CN | 204178219 U | 2/2015 |
| CN | 104197994 B | 8/2016 |
| WO | 2018206952 A1 | 11/2018 |

OTHER PUBLICATIONS

Andrew Zaleski; Google Glass Gets a Second Chance in the Field; FSD Servicemax website; Sep. 28, 2017.

(Continued)

*Primary Examiner* — Neil R McLean
(74) *Attorney, Agent, or Firm* — Duft & Bornsen, PC

(57) ABSTRACT

System and method for enhanced printer and printer operator interactions. One embodiment includes a maintenance controller in communication with a camera having a field of view overlapping with a field of view of a human operator, and in communication with a display to display images for the human operator. The maintenance controller obtains a first image of the printer components, analyzes the first image to determine locations of the printer components in the first image based on the image data of the printer components stored in the memory, and modifies the first image to include highlighted areas corresponding with the locations of the printer components. The maintenance controller receives an instruction from the human operator indicating one of the highlighted areas as a selected printer component, retrieves the maintenance information of the selected printer component from memory, and sends the maintenance information to the display.

16 Claims, 6 Drawing Sheets

(56) References Cited

U.S. PATENT DOCUMENTS

| | | | |
|---|---|---|---|
| 2003/0110412 A1 | 6/2003 | Neville | |
| 2012/0192077 A1* | 7/2012 | Castellani | H04N 1/00344 |
| | | | 715/740 |
| 2012/0249588 A1* | 10/2012 | Tison | G06F 1/1696 |
| | | | 345/633 |
| 2012/0324118 A1 | 12/2012 | Pfleider et al. | |
| 2018/0013899 A1 | 1/2018 | Fukasawa | |
| 2019/0130163 A1* | 5/2019 | Guo | G06Q 10/08 |

OTHER PUBLICATIONS

Discover Glass Enterprise Edition; A hands-free device for smarter and faster hands-on work; https://www.google.com/glass.

Jacki O'Neill et al; From Ethnographic Study to Mixed Reality: A Remote Collaborative Troubleshooting System; In Proceedings of the ACM 2011 conference on Computer supported cooperative work, 225-234. ACM; Mar. 2011.

Steven Levy; Wired Magazine; Backchannel; Google Glass 2.0 is a Startling Second Act.

Work together from anywhere; Empower technicians to solve problems more efficiently by working together from different locations with dynamics 365 Remote Assist and HoloLens devices; https://dynamics.microsoft.com.

European Search Report; Application EP20194384; dated Feb. 5, 2021.

Gupta Archie et al; Hand Gesture Based Region marking for Tele-Support using Wearables; Jul. 21, 2017; XP033145796.

Steven Feiner et al; Knowledge-base Augmented Reality Presentation; Jul. 1, 1993; XP055767607.

Steven Feiner et al; Knowledge-based Augmented Reality; Junly 1, 1993; XP058348778.

* cited by examiner

ENHANCED PRINTER AND PRINTER OPERATOR INTERACTIONS

FIELD OF THE INVENTION

The invention relates to the field of printing systems and, in particular, to printers capable of interacting with a printer operator.

BACKGROUND

Entities with substantial printing demands often use a production printer that prints on a web of print media at high-speed (e.g., one hundred pages per minute or more). A production printer typically includes a print controller that controls the overall operation of the printing system, and a print engine that physically marks the web. The print engine has an array of printheads and each individual printhead includes multiple tiny nozzles (e.g., 360 nozzles per printhead depending on resolution) that are operable to discharge ink as controlled by the printhead controller. Due to the increasingly complex arrangement of internal components inside a production printer, it takes a significant amount of time and training for personnel to perform maintenance operations.

SUMMARY

Embodiments described herein provide for enhanced printer and printer operator interactions. The printer is enhanced to detect the area of the printer that the operator is working on and then provide guidance on performing service operations for that area. The guidance may include confirmation of a correct area, warnings of incorrect devices/actions, or further information on next steps. The specific area or component within the printer may be detected by captured images of a headset device worn by the operator. Additionally, the operator's audio and/or a gesture/pointing device within the captured image may indicate specific areas or subassemblies within the printer selected by the operator. By determining the diagnostic direction of the maintenance procedure in real-time, the printer is able to provide immediate, hands-free guidance to the operator to restore the printer's functional area quickly.

In one embodiment, a system includes memory configured to store image data of printer components, and maintenance information of the printer components. The system also includes a maintenance controller in communication with a camera having a field of view overlapping with a field of view of a human operator, and in communication with a display to display images for the human operator. The maintenance controller is configured to obtain from the camera a first image of the printer components, to analyze the first image to determine locations of the printer components in the first image based on the image data of the printer components stored in the memory, to modify the first image to include highlighted areas corresponding with the locations of the printer components, and to send the modified first image to the display. The maintenance controller is further configured to receive an instruction from the human operator indicating one of the highlighted areas as a selected printer component, to retrieve the maintenance information of the selected printer component from the memory based on the instruction, and to send the maintenance information to the display.

Another embodiment is a method that includes storing, in memory, image data of printer components and maintenance information of the printer components. The method further includes obtaining, with a maintenance controller in communication with a camera having a field of view overlapping with a field of view of a human operator, a first image of the printer components from the camera. The method also includes analyzing the first image to determine locations of the printer components in the first image based on the image data of the printer components stored in the memory, modifying the first image to include highlighted areas corresponding with the locations of the printer components, and sending the modified first image to a display for the human operator. The method further includes receiving an instruction from the human operator indicating one of the highlighted areas as a selected printer component, retrieving the maintenance information of the selected printer component from the memory based on the instruction, and sending the maintenance information to the display.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
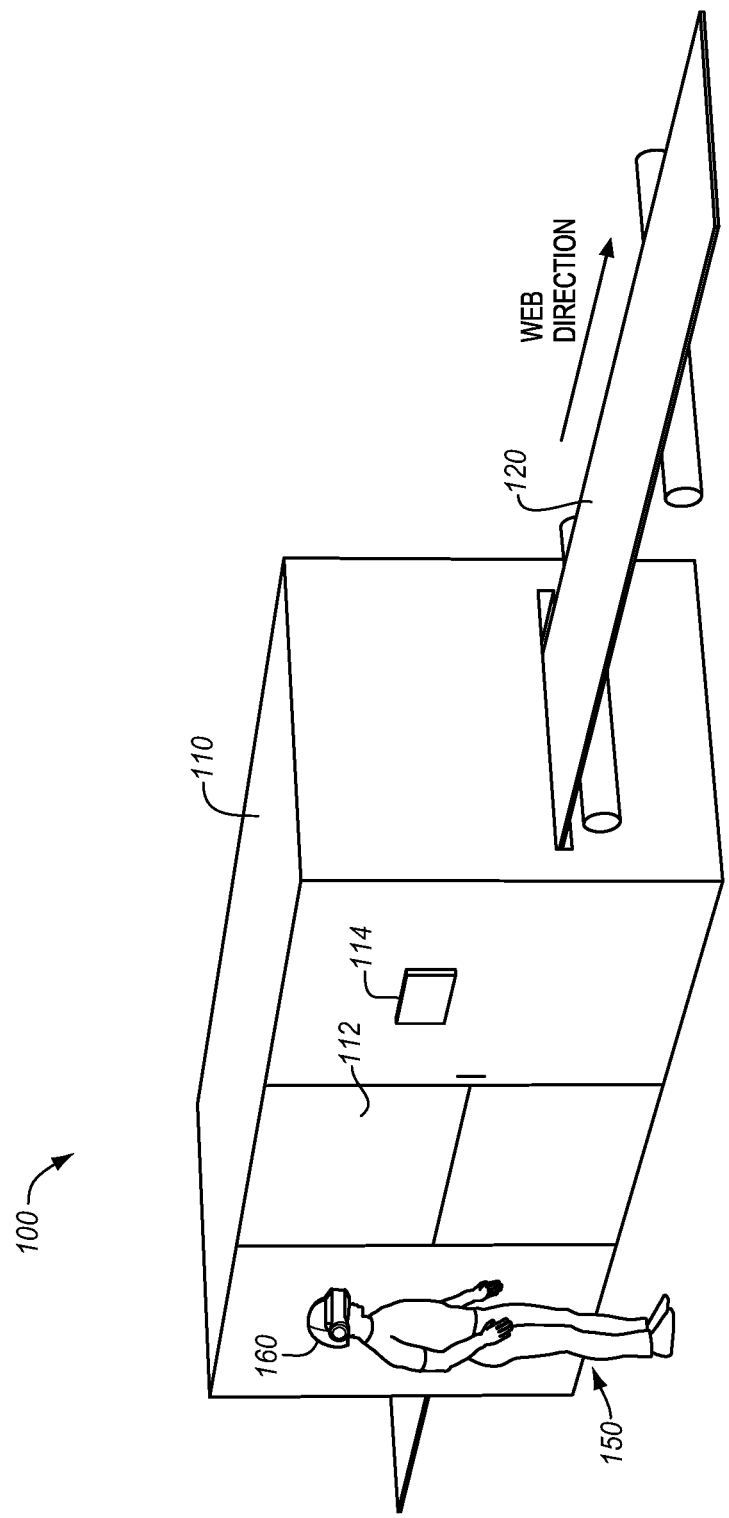
FIG. 1 is a print system in an illustrative embodiment.

FIG. 1 is a print system 100 in an illustrative embodiment. The print system 100 includes a printer 110 that applies marks to a print medium 120. The applied marking material may comprise ink in the form of any suitable fluid (e.g., aqueous inks, oil-based paints, additive manufacturing materials, etc.) for marking the print medium 120. As shown in this example, the printer 110 may comprise a continuous-form inkjet printer that prints on a web of continuous-form media, such as paper. However, embodiments described herein may apply to alternative print systems such as cut-sheet printers, wide format printers, 3D printers, etc. Alternatively or additionally, the embodiments here may instead apply to other types of equipment serviceable by human operators and having serviceable physical components.

A human operator 150 may need to perform a function or action on the printer 110. For example, the human operator 150 may open a cover 112 of the printer 110 to replace, fix, and/or adjust components inside the printer 110. The human operator 150 may also interact with a Graphical User Interface (GUI) 114 of the printer 110 to view and/or manipulate the status or settings of the printer 110. As described in further detail below, the printer 110 is enhanced to provide maintenance guidance to the human operator 150 via an Augmented Reality (AR) headset 160 worn by the human operator 150. AR headset 160 may be worn on body parts (e.g. head, arm, shoulder or chest) of the human operator or other extensions (e.g. hat, clothing or jewelry) of the human operator 150.

Figure 2:
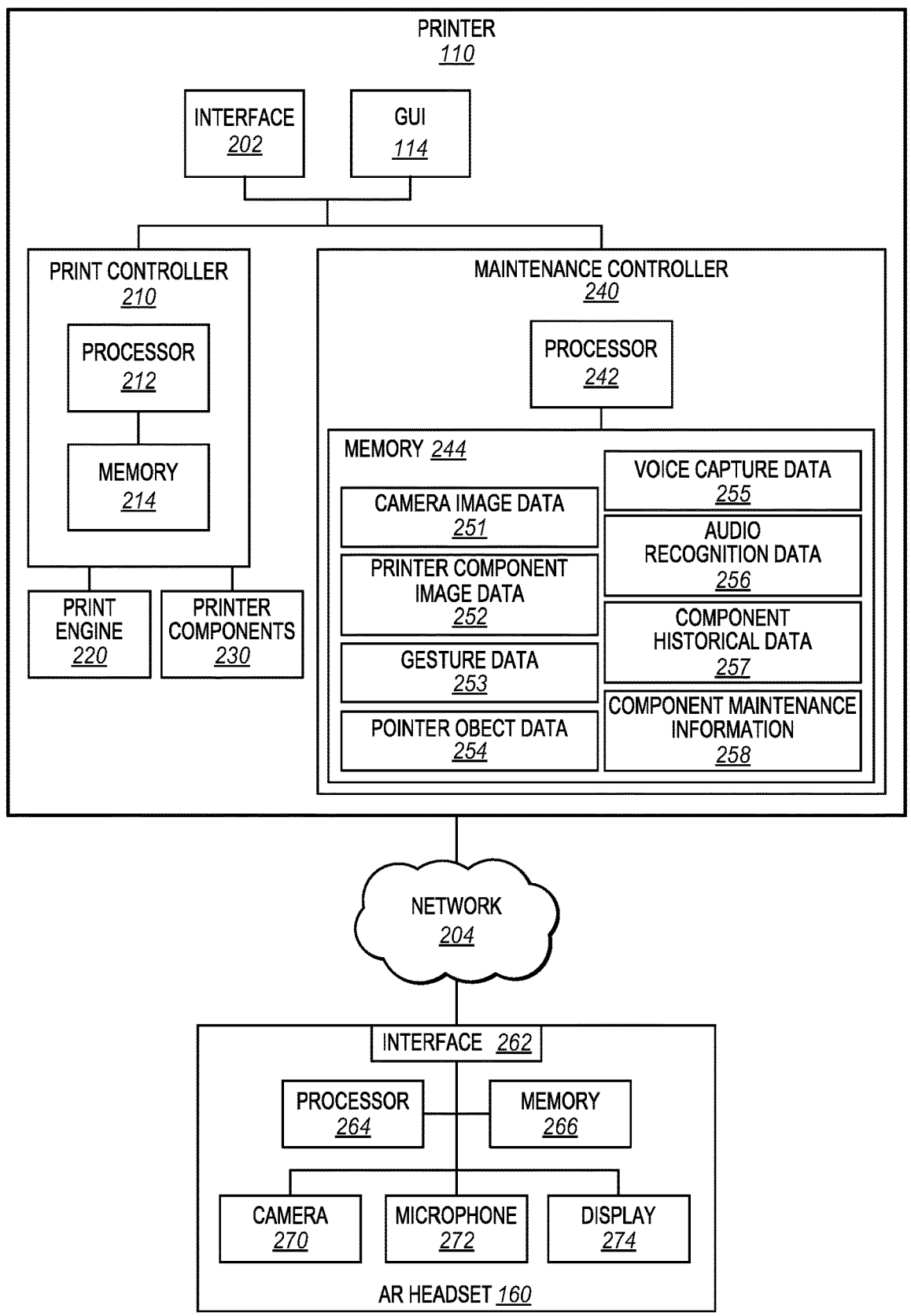
FIG. 2 is a block diagram of a printer and AR headset in an illustrative embodiment.

FIG. 2 is a block diagram of the printer 110 and the AR headset 160 in an illustrative embodiment. The printer 110 and the AR headset 160 include respective interfaces 202/262 (e.g., wireless interfaces) to exchange data over a network 204 (e.g., wireless LAN). The AR headset 160 may include a camera 270, microphone 272, and/or display 274. Generally, the printer 110 receives data captured by the camera 270 and the microphone 272 and transmits data to the display 274 for view by the human operator 150. The display 274 may include a portable display worn by the human operator 150 with a screen positioned within the human operator 150 field of view, and the screen may include a transparent screen to display information in front of the human operator 150 without obstructing their vision. Alternatively or additionally, the printer 110 may transmit images for viewing by the human operator 150 to a non-transparent display or display not worn by the human operator 150 such as the GUI 114 of the printer 110.

The printer 110 includes a print controller 210, a print engine 220, and printer components 230. The print controller 210 is configured to rasterize print jobs into bitmap data. The print engine 220 receives the rasterized pages and marks physical sheets of media. The printer components 230 may include any mechanical or electrical components installed in the printer 110.

The printer 110 is enhanced with a maintenance controller 240 that is configured to provide guidance to the human operator 150 via the AR headset 160 for performing maintenance functions on the printer components 230. In particular, the maintenance controller 240 receives, for storage in memory 244, camera image data 251 from the camera 270 of the AR headset 160. Typically, the camera 270 worn by the human operator 150 has a field of view that overlaps or aligns with a field of view of a human operator 150. Accordingly, the camera image data 251 may include images that represent the vision and area of interest of the human operator 150. Alternatively, maintenance controller 240 may be implemented separate from printer 110 and be communicatively coupled to AR headset 160.

The maintenance controller 240 also stores printer component image data 252 to be able to recognize particular printer components 230 present in the camera image data 251. The maintenance controller 240 may also store gesture data 253 and/or pointer object data 254 to recognize a selection of a particular printer component 230 within the camera image data 251 by the human operator 150. Alternatively or additionally, the maintenance controller 240 may receive voice capture data 255 from the microphone 272 of the AR headset 160. And, the maintenance controller 240 may also store audio recognition data 256 to recognize particular audio commands in the voice capture data 255. The maintenance controller 240 may also store component historical data 257 to facilitate determining the diagnostic direction the human operator 150 may undertake, and component maintenance information 258 that includes instructions for servicing the printer components 230.

The maintenance controller 240, print controller 210, and AR headset 160 may each include one or more processors 242/212/264 coupled with memory 244/214/266. A processor includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. Memory includes any hardware device that is able to store data, and may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. It will be appreciated that the particular arrangement, number, and configuration of components and elements described herein with respect to FIG. 2 is an example provided for discussion purposes and that numerous alternatives to such is possible. For example, in some embodiments, the maintenance controller 240 may be implemented partially or wholly with the AR headset 160. Illustrative details of the operation of the print system 100 and the maintenance controller 240 will be discussed with regard to FIG. 3.

Figure 3:
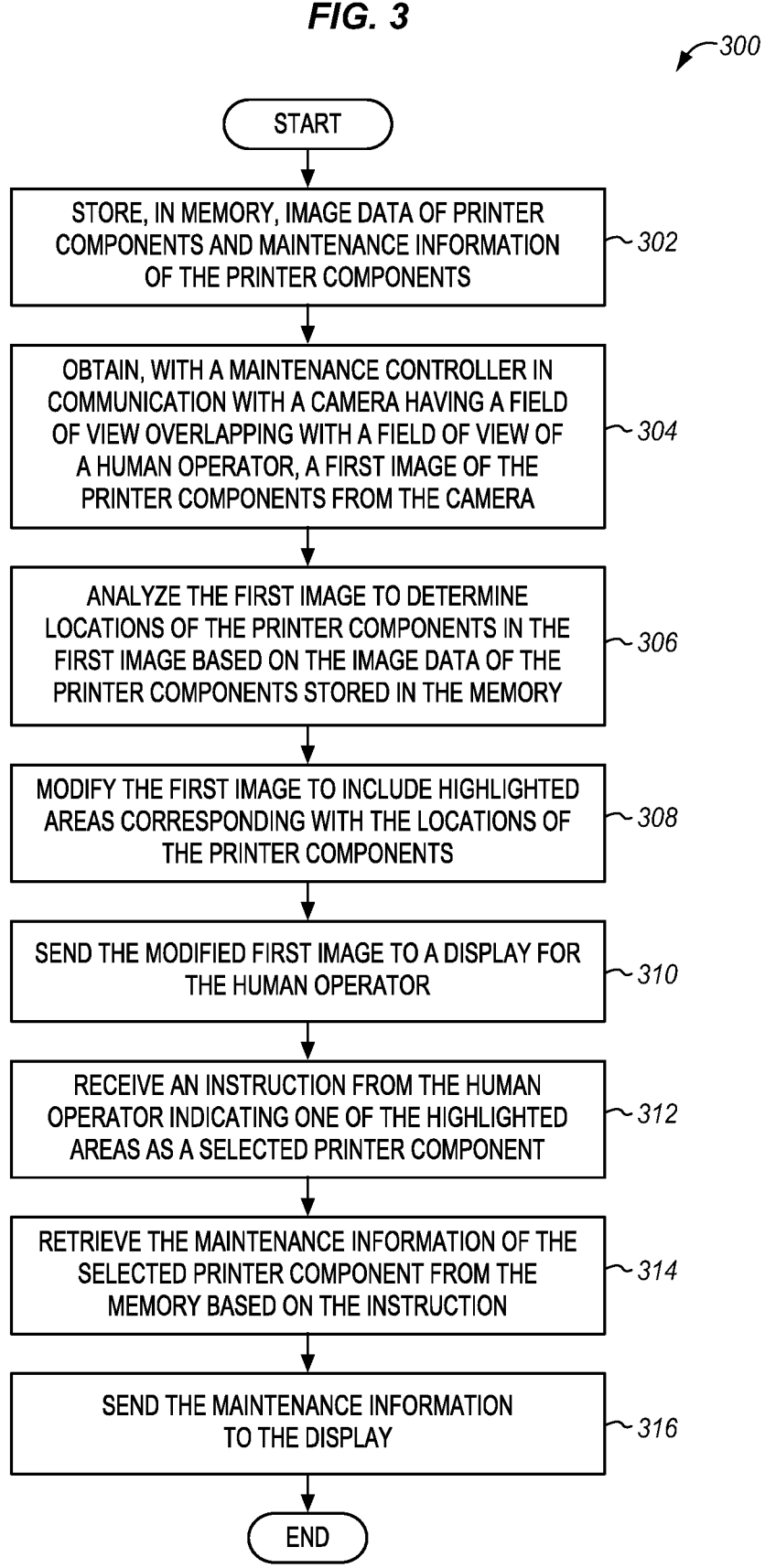
FIG. 3 is a flow chart illustrating a method for guiding a printer maintenance operation in an illustrative embodiment.

FIG. 3 is a flow chart illustrating a method 300 for guiding a printer maintenance operation in an illustrative embodiment. The steps of method 300 will be described with respect to the printer 110 and the AR headset 160 of FIGS. 1-2, although one skilled in the art will understand that the method 300 may be performed by other systems not shown. The steps of the flow charts described herein are not all inclusive, may include other steps not shown, and may be performed in alternative orders.

In step 302, image data of the printer components 230 and maintenance information of the printer components 230 is stored in memory. Image data and/or maintenance information of the printer components 230 may additionally include expected locations and/or expected presence of the printer components 230 in printer 110. Expected locations of the printer components 230 in printer 110 may be based on the location of other printer components 230 and/or portions of the printer 110 (e.g. an electrical panel). The image data of the printer components 230 may include one or more images associated with each of the printer components 230 that is stored in memory in advance. The maintenance information of the printer components 230 may include one or more sets of instructions or guidance for servicing each of the printer components 230 that is stored in memory in advance.

In step 304, the maintenance controller 240 obtains, from the camera 270 having a field of view overlapping with a field of view of the human operator 150, a first image of the printer components 230. For example, the first image may include a view of an exposed side of the printer 110 showing multiple printer subassemblies or printer components 230. The first image may include a snapshot taken by the human operator 150 or may be detected through video/image analysis performed by the maintenance controller 240.

In step 306, the maintenance controller 240 analyzes the first image to determine locations of the printer components 230 in the first image based on the image data of the printer components 230 stored in the memory. In doing so, the maintenance controller 240 may perform pattern recognition to identify a bounded area within the first image that matches with an image of a particular printer component pre-stored in memory.

In step 308, the maintenance controller 240 modifies the first image to include highlighted areas corresponding with the locations of the printer components 230. That is, for each of the bounded areas within the first image corresponding with a particular printer component, the maintenance controller 240 may superimpose a colored outline around the perimeter of the bounded area. In other words, the highlighted areas may include bounding boxes that accentuate a perimeter of the locations of the printer components 230 and thus modify the first image. The bounding boxes may have different colors to visually differentiate the printer components 230 in the modified first image. The bounding boxes may be graphically composed of straight lines and/or curves. In some embodiments, at least one of the highlighted areas corresponds with a printer component that is not present in the first image (e.g., not installed in the printer 110 at an expected location in the printer 110).

In step 310, the maintenance controller 240 sends the modified first image to a display for the human operator 150. And, in step 312, the maintenance controller 240 receives an instruction from the human operator 150 indicating one of the highlighted areas as a selected printer component. In one embodiment, the instruction from the human operator 150 is included in a second image obtained by the camera 270. For example, the second image may include a gesture by the human operator 150 that selects one of the highlighted areas. Alternatively or additionally, the maintenance controller 240 may be configured to detect a pointing device (e.g., handheld object such as a pencil) in the second image that selects one of the highlighted areas. The maintenance controller 240 may analyze the second image in reference to the first image to determine which of the highlighted areas of the first image corresponds or overlaps with the gesture or pointing device in the second image to determine the selection.

In some embodiments, the maintenance controller 240 is configured to correlate the gesture or pointing device to a particular instruction (e.g. request, command or confirmation). For example, in addition to indicating an area of interest of the printer 110, the gesture or pointing device may indicate an instruction for additional maintenance information that corresponds with the selected area. Examples of additional maintenance information include information on how to remove the selected component, to identify the name or type of the selected printer component, to identify the subassembly of components within the larger assembly selected, to confirm that the selected printer component is the correct component for the maintenance operation, to designate the selected printer component as defective, and/or to order a replacement of the selected component. The maintenance controller 240 may perform video/image pattern recognition to identify gestures (e.g., hand positions, signs, or motions) captured by the camera 270 that match with gesture data 253 or pointer object data 254 stored in memory that correlate with a particular instruction.

Alternatively or additionally, the maintenance controller 240 may obtain audio from the microphone 272 (e.g., included in the camera 270 or AR headset 160) that includes the instruction indicating one of the highlighted areas. The printer components 230 and highlighted areas in the first image may correspond with a name, label, or highlight color corresponding with audio recognition data 256 stored in memory. The maintenance controller 240 may perform audio pattern recognition to identify one of the highlighted areas of the first image as a selection based on voice capture data 255 spoken into the microphone 272 by the human operator 150. Alternatively or additionally, the maintenance controller 240 may correlate the audio captured by the microphone 272 with the gesture or pointing device captured by the camera 270 to determine a request or instruction for additional maintenance information corresponding with a selected area. For example, as the maintenance controller 240 detects a hand of the human operator 150 covering an area in the second image to determine a selected one of the printer components 230, it may detect a request or instruction for additional information via audio that pertains to the selected printer component.

In step 314, the maintenance controller 240 retrieves the maintenance information of the selected printer component from the memory based on the instruction. For example, the maintenance controller 240 may determine whether video/image/audio input from the AR headset 160 is requesting maintenance information, and/or a specific subcategory of additional maintenance information, stored in memory for one of the printer components 230. Each of the printer components 230 may correspond with multiple categories of maintenance information stored as component maintenance information 258 in memory. For example, one of the printer components 230 may be associated with guidance for each of a plurality of different maintenance operations, such as guidance to remove, fix, or install with respect to the printer 110. Each of the printer components 230 may be associated with a part number, part description, and one or more maintenance operation guides correlated in a database. Furthermore, each maintenance operation may correspond with guides of different formats, such as text to display that explains the procedure as a series of steps and/or video/images to display that illustrate the steps. Accordingly, the maintenance controller 240 may analyze the instruction to determine which particular set of maintenance information of the selected printer component to retrieve from memory.

In step 316, the maintenance controller 240 sends the maintenance information to the display. For instance, for embodiments in which the request includes removal information of the selected printer component, the maintenance controller 240 retrieves the removal information of the selected printer component from memory, and sends the removal information to the display in the view of the human operator 150. For embodiments in which the request includes additional maintenance information of the selected printer component, the maintenance controller 240 retrieves the additional maintenance information of the selected printer component from memory, and sends the additional maintenance information to the display. Thus, the method 300 provides a technical benefit in providing real-time, hands-free guidance to display for the human operator 150 for a specific area of interest in the printer 110. With the maintenance controller 240 configured to interpret image/audio data captured by the AR headset 160 as defined informational requests related to the printer 110, tailored guidance for specific areas within the printer 110 can be provided during the course of maintenance procedures. Further embodiments for interacting with the human operator 150 during a maintenance procedure are described below.

Figure 4:
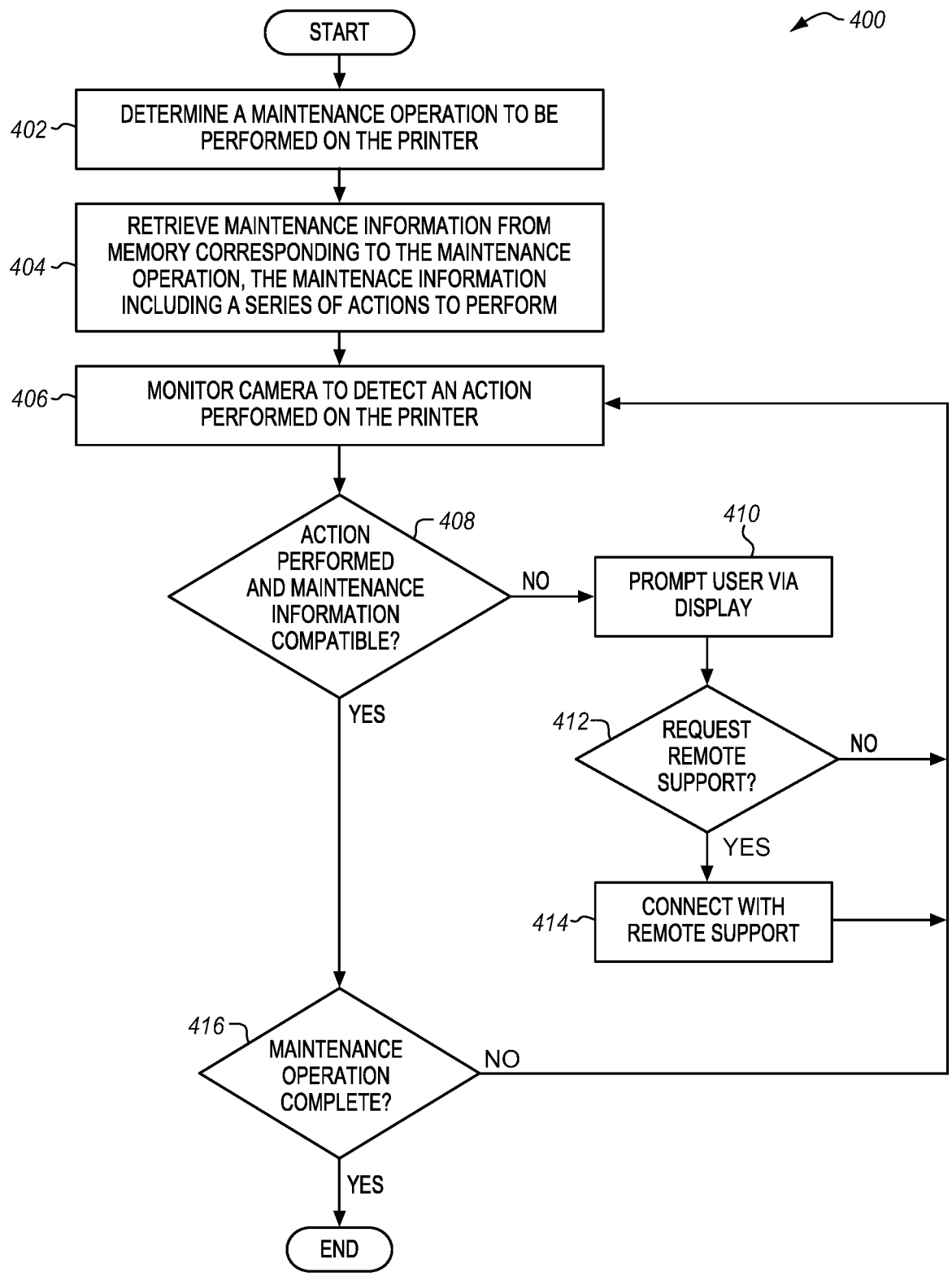
FIG. 4 is a flow chart illustrating a method for guiding a printer maintenance operation in another illustrative embodiment.

FIG. 4 is a flow chart illustrating a method 400 for guiding a printer maintenance operation in another illustrative embodiment. The steps of method 400 will be described with respect to the printer 110 and the AR headset 160 of FIGS. 1-2, although one skilled in the art will understand that the method 400 may be performed by other systems not shown. The steps of the flow charts described herein are not all inclusive, may include other steps not shown, and may be performed in alternative orders.

In step 402, the maintenance controller 240 determines a maintenance operation to be performed on the printer 110. Determination of the maintenance operation may be based on audio/visual input from the AR headset 160, user input to the GUI 114, component maintenance information 258, or some combination thereof. For example, the maintenance controller 240 may detect multiple subassemblies in the field of view of the camera 270 and retrieve recent diagnostic data and/or a historical replacement rate for each of the subassemblies. The maintenance controller 240 may also monitor the status of the printer 110 and/or the printer components 230 to estimate a probability that a given maintenance procedure is forthcoming. Accordingly, using a combination of input based on the actions of the human operator 150 and diagnostic data of components identified by that input, the maintenance controller 240 may determine or predict the area of interest and the maintenance procedure that is to be performed on the printer 110.

In step 404, the maintenance controller 240 retrieves maintenance information from memory corresponding to the maintenance operation. As earlier described, the maintenance information may include a series of actions to perform on one or more components of the printer 110. Examples of maintenance operations include paper replacement, ink replacement, and general maintenance. Alternatively or additionally, the maintenance information may include a statistical analysis of the printer components 230. In one embodiment, the maintenance controller 240 may prompt the human operator 150 via the display to monitor a particular area for proper operation during a diagnostic test. In another embodiment, the maintenance controller 240 provides assistance using the AR headset 160 to display the part, part location, etc.

In step 406, the maintenance controller 240 monitors the camera 270 to detect an action performed on the printer 110. And, in step 408, the maintenance controller 240 determines whether the action performed according to images captured by the camera 270 is compatible with the maintenance information. For example, the maintenance controller 240 may determine if the human operator 150 is taking or is about to take an incorrect step as outlined in the maintenance information.

If the action performed is not compatible in step 408, the method 400 proceeds to step 410 and the maintenance controller 240 prompts the display to issue a warning and/or display a corrective action to the human operator 150. Next, in step 412, the maintenance controller 240 may determine whether to request remote support. If so, the method proceeds to step 414 and the maintenance controller 240 may connect the AR headset 160 with remote support. For example, if actions performed by the human operator 150 continue to violate the maintenance information steps for a period of time, or if the maintenance controller 240 detects a request from the human operator 150 for remote support via the AR headset 160, the maintenance controller 240 may initiate contacting live support (e.g., via the network 204). Then, in step 414, the method 400 may return to step 406 to continue monitoring of the camera 270 with remote support.

Thus, a backup is enabled in which a remote operator can assist with the maintenance operation by receiving data captured by the AR headset 160 and communicating with the human operator 150 in real-time via the AR headset 160.

Otherwise, if the action performed is compatible in step 408, the method 400 proceeds to step 416 and the maintenance controller 240 determines whether the maintenance operation is complete. If not, the method returns to step 406 to continue monitoring the camera 270 for subsequent actions to perform according to the maintenance information. Otherwise, the maintenance controller 240 determines that the maintenance operation is complete and the method 400 ends. Thus, the method 400 provides a technical benefit by providing real-time training to service a printer component while the human operator 150 performs a maintenance operation.

EXAMPLES

Figure 5:
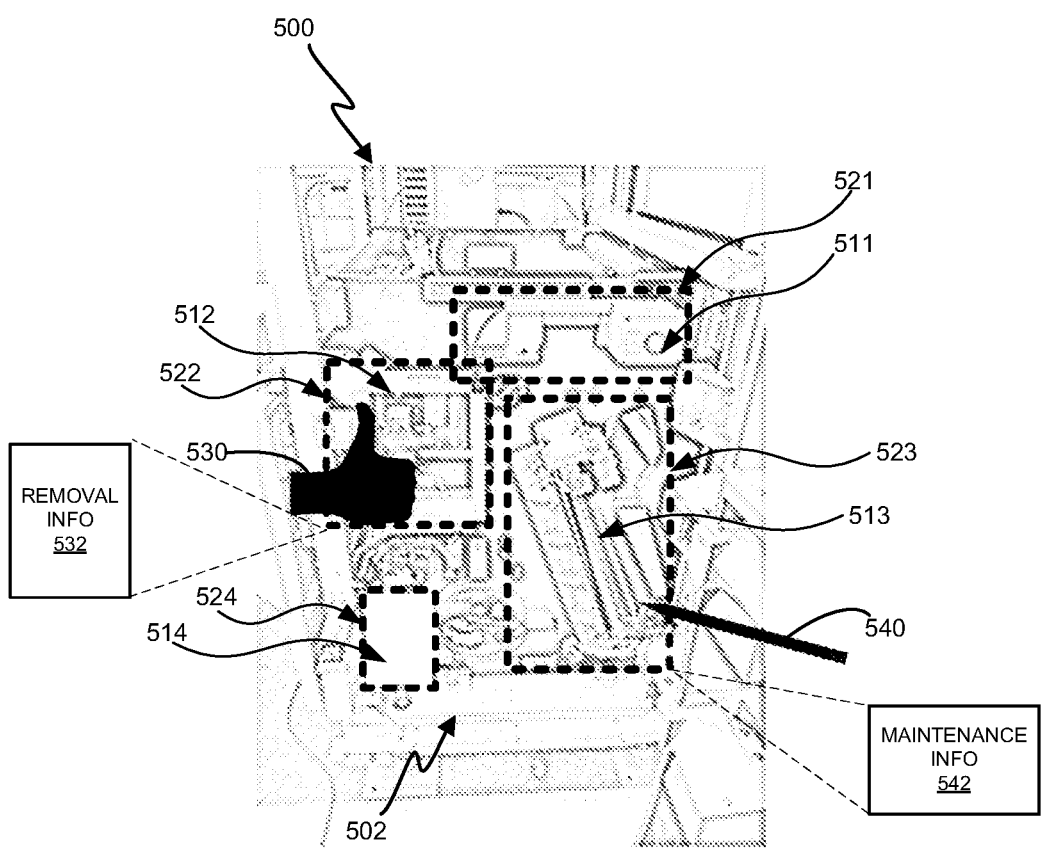
FIG. 5 is an example display image of an internal section of a printer in an illustrative embodiment.

FIG. 5 is an example display image 500 of an internal section 502 of a printer in an illustrative embodiment. After opening the printer, the maintenance controller 240 detects, via camera 270, printer components 511-513 in the internal section 502 of the printer as viewed in the display image 500. In response to detecting the printer components 511-513, the maintenance controller 240 generates highlighted areas 521-523 (e.g., bounding boxes) in the display image 500 corresponding with the printer components 511-513. Additionally, the maintenance controller 240 detects a printer component 514 not present in the display image 500 (e.g., an empty card slot) that is expected in the internal section 502, and generates a highlighted area 524 corresponding with the missing printer component 514.

The human operator 150 interacts with the display image 500, via camera 270 and display 274, to instruct the maintenance controller 240 for retrieving information regarding the printer components 511-514. For example, a gesture 530 that overlaps with the highlighted area 522 may trigger the maintenance controller 240 to generate removal information 532 for printer component 512 for display. In another example, a pointing device 540 that is in view of camera 270 in an area corresponding with highlighted area 523 may initialize retrieval of maintenance information 542 (e.g., additional maintenance information) for printer component 513.

Figure 6:
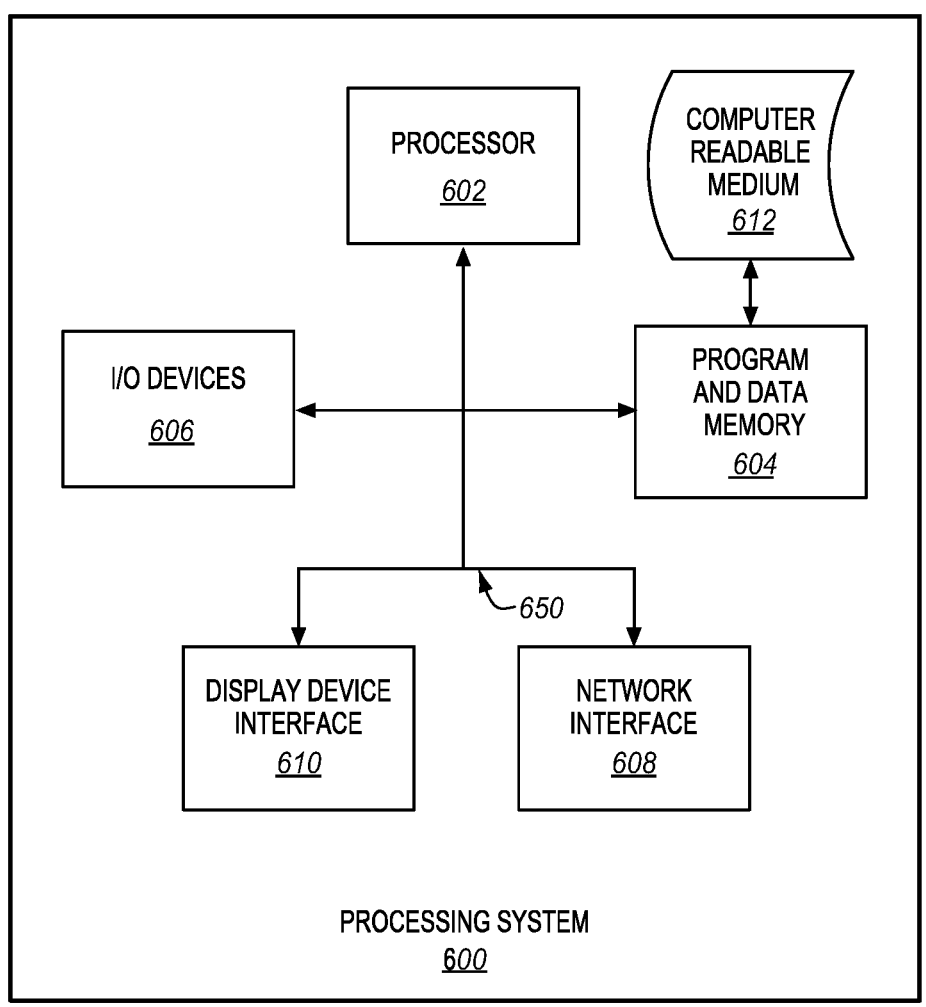
FIG. 6 illustrates a computer system operable to execute computer readable medium embodying programmed instructions to perform desired functions in an illustrative embodiment.

Embodiments disclosed herein can take the form of software, hardware, firmware, or various combinations thereof. In one particular embodiment, software is used to direct a processing system to perform the various operations disclosed herein. FIG. 6 illustrates a processing system 600 operable to execute a computer readable medium embodying programmed instructions to perform desired functions in an illustrative embodiment. Processing system 600 is operable to perform the above operations by executing programmed instructions tangibly embodied on computer-readable storage medium 612. In this regard, embodiments of the invention can take the form of a computer program accessible via computer-readable medium 612 providing program code for use by a computer or any other instruction execution system. For the purposes of this description, computer-readable storage medium 612 can be anything that can contain or store the program for use by the computer.

Computer-readable storage medium 612 can be an electronic, magnetic, optical, electromagnetic, infrared, or semiconductor device. Examples of computer-readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments were described herein, the scope of the invention is not limited to those specific embodiments. The scope of the invention is defined by the following claims and any equivalents thereof

What is claimed is:

1. A system comprising:
memory configured to store image data of printer components, and maintenance information of the printer components; and
a maintenance controller in communication with a camera having a field of view overlapping with a field of view of a human operator, and in communication with a display to display images for the human operator,
the maintenance controller configured to obtain from the camera a first image of the printer components, to analyze the first image to determine locations of the printer components in the first image based on the image data of the printer components stored in the memory, to modify the first image to include highlighted areas corresponding with the locations of the printer components, and to send the modified first image to the display,
the maintenance controller configured to receive an instruction from the human operator indicating one of the highlighted areas as a selected printer component, to retrieve the maintenance information of the selected printer component from the memory based on the instruction, and to send the maintenance information to the display, and
the maintenance controller is configured to obtain from the camera a second image of the printer components, wherein the instruction from the human operator is included in the second image.

2. The system of claim 1 wherein:
the maintenance controller is configured to analyze the second image to identify a gesture in the second image that selects the one of the highlighted areas.

3. The system of claim 1 wherein:
the maintenance controller is configured to analyze the second image to identify a pointing device in the second image that selects the one of the highlighted areas.

4. The system of claim 1 wherein:
the instruction includes a request for additional maintenance information of the selected printer component, and
the maintenance controller is configured to retrieve the additional maintenance information of the selected printer component from memory, and to send the additional maintenance information to the display.

5. The system of claim 1 wherein:
the instruction includes a request for removal information of the selected printer component, and
the maintenance controller is configured to retrieve the removal information of the selected printer component from memory, and to send the removal information to the display.

6. The system of claim 1 wherein:
the highlighted areas include bounding boxes that accentuate a perimeter of the locations of the printer components in the first image, the bounding boxes having different colors to visually differentiate the printer components.

7. The system of claim 1 wherein:
at least one of the highlighted areas corresponds with a printer component that is not present in the first image.

8. A method comprising:
storing, in memory, image data of printer components and maintenance information of the printer components;
obtaining, with a maintenance controller in communication with a camera having a field of view overlapping with a field of view of a human operator, a first image of the printer components from the camera;
analyzing the first image to determine locations of the printer components in the first image based on the image data of the printer components stored in the memory;
modifying the first image to include highlighted areas corresponding with the locations of the printer components;
sending the modified first image to a display for the human operator;
receiving an instruction from the human operator indicating one of the highlighted areas as a selected printer component;
obtaining, from the camera, a second image of the printer components, wherein the instruction from the human operator is included in the second image;
retrieving the maintenance information of the selected printer component from the memory based on the instruction; and
sending the maintenance information to the display.

9. The method of claim 8 further comprising:
analyzing the second image to identify a gesture in the second image that selects the one of the highlighted areas.

10. The method of claim 8 further comprising:
analyzing the second image to identify a pointing device in the second image that selects the one of the highlighted areas.

11. A non-transitory computer readable medium including programmed instructions which, when executed by a processor, are operable for performing a method, the method comprising:

storing, in memory, image data of printer components and maintenance information of the printer components;

obtaining, with a maintenance controller in communication with a camera having a field of view overlapping with a field of view of a human operator, a first image of the printer components from the camera;

analyzing the first image to determine locations of the printer components in the first image based on the image data of the printer components stored in the memory;

modifying the first image to include highlighted areas corresponding with the locations of the printer components;

sending the modified first image to a display for the human operator;

receiving an instruction from the human operator indicating one of the highlighted areas as a selected printer component;

obtaining, from the camera, a second image of the printer components, wherein the instruction from the human operator is included in the second image;

retrieving the maintenance information of the selected printer component from the memory based on the instruction; and sending the maintenance information to the display.

12. The non-transitory computer readable medium of claim 11 wherein the method further comprises:

analyzing the second image to identify a gesture in the second image that selects the one of the highlighted areas.

13. The non-transitory computer readable medium claim 11 wherein the method further comprises:

analyzing the second image to identify a pointing device in the second image that selects the one of the highlighted areas.

14. The non-transitory computer readable medium claim 11 wherein:

the highlighted areas include bounding boxes that accentuate a perimeter of the locations of the printer components in the first image, the bounding boxes having different colors to visually differentiate the printer components.

15. A system comprising:

memory configured to store image data of printer components, and maintenance information of the printer components; and a maintenance controller in communication with a camera having a field of view overlapping with a field of view of a human operator, and in communication with a display to display images for the human operator, the maintenance controller configured to obtain from the camera a first image of the printer components, to analyze the first image to determine locations of the printer components in the first image based on the image data of the printer components stored in the memory, to modify the first image to include highlighted areas corresponding with the locations of the printer components, and to send the modified first image to the display, the maintenance controller configured to obtain audio from the camera that includes an instruction from the human operator indicating one of the highlighted areas as a selected printer component, to retrieve the maintenance information of the selected printer component from the memory based on the instruction, and to send the maintenance information to the display.

16. A method comprising:

storing, in memory, image data of printer components and maintenance information of the printer components;

obtaining, with a maintenance controller in communication with a camera having a field of view overlapping with a field of view of a human operator, a first image of the printer components from the camera;

analyzing the first image to determine locations of the printer components in the first image based on the image data of the printer components stored in the memory;

modifying the first image to include highlighted areas corresponding with the locations of the printer components;

sending the modified first image to a display for the human operator;

obtaining audio from the camera that includes an instruction from the human operator indicating one of the highlighted areas as a selected printer component;

retrieving the maintenance information of the selected printer component from the memory based on the instruction; and sending the maintenance information to the display.

* * * * *